Sept. 1, 1936.　　　　T. H. HALLWOOD　　　　2,052,927
BREAD TOASTER
Filed June 8, 1933　　　4 Sheets-Sheet 1
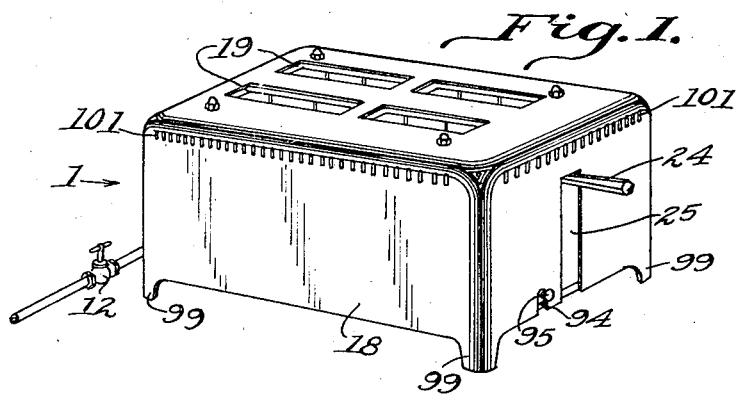
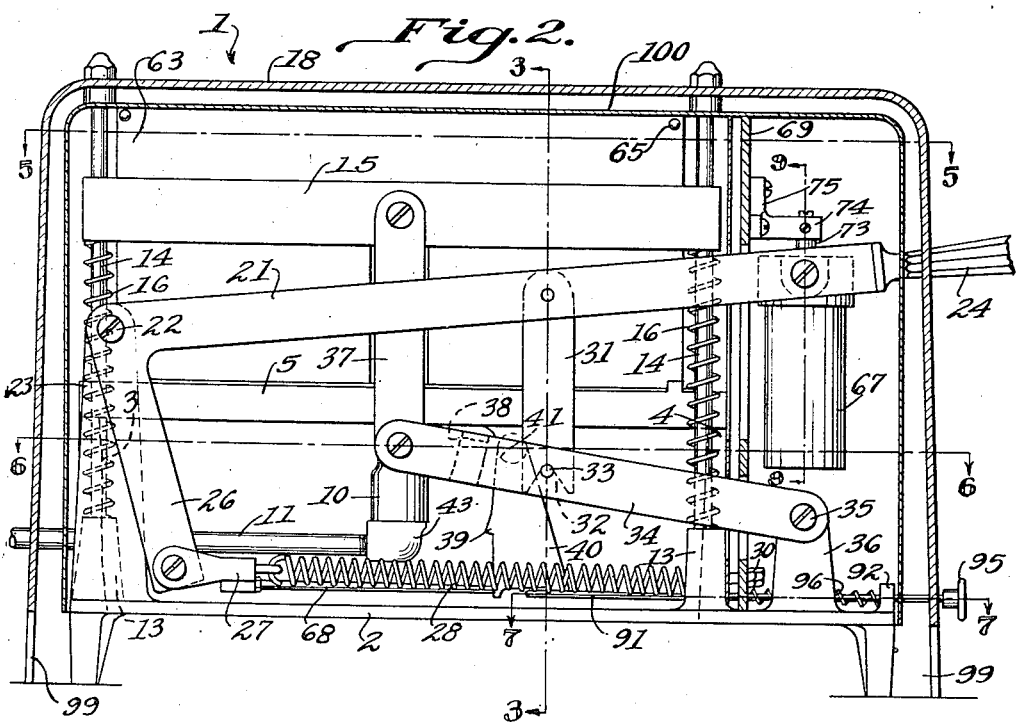
Inventor
Thomas H. Hallwood
By W. S. McDowell
Attorney Sept. 1, 1936.  T. H. HALLWOOD  2,052,927
BREAD TOASTER
Filed June 8, 1933  4 Sheets-Sheet 2

Inventor
Thomas H. Hallwood

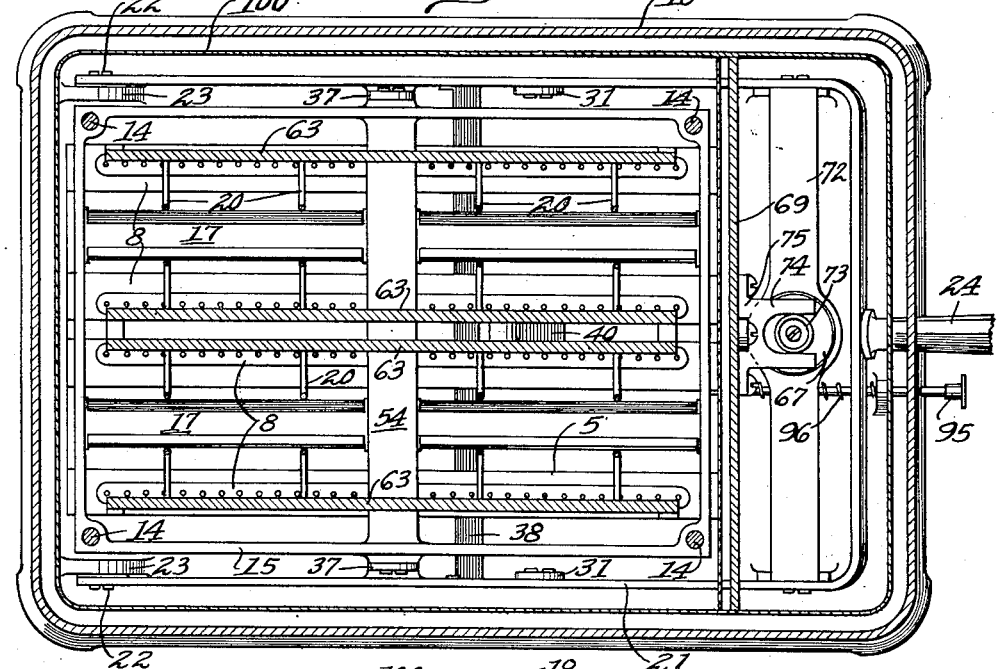
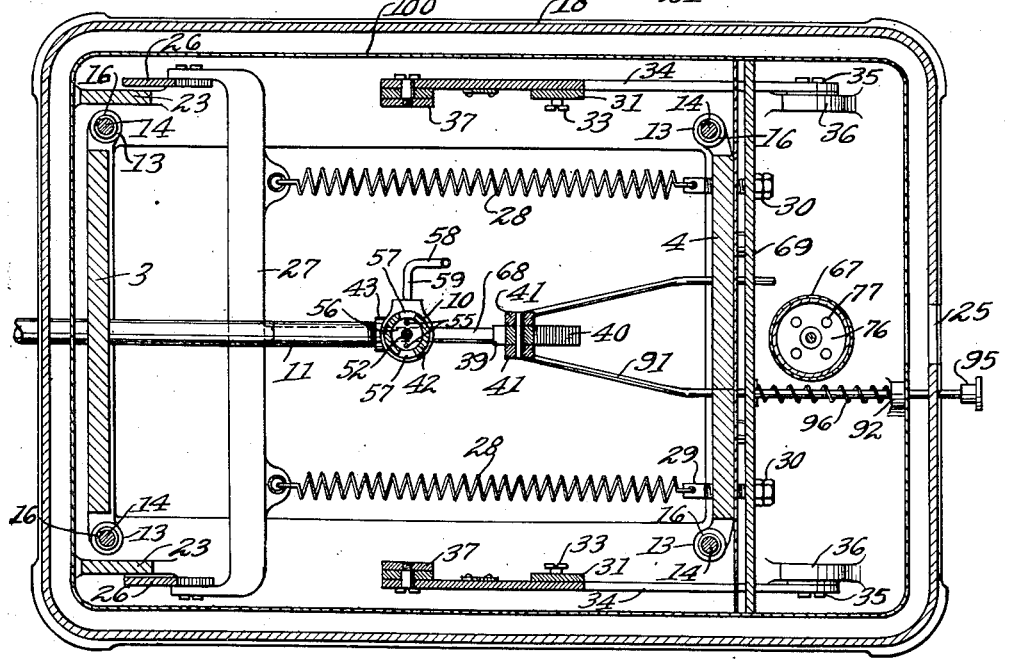

Sept. 1, 1936. T. H. HALLWOOD 2,052,927
BREAD TOASTER
Filed June 8, 1933 4 Sheets-Sheet 4
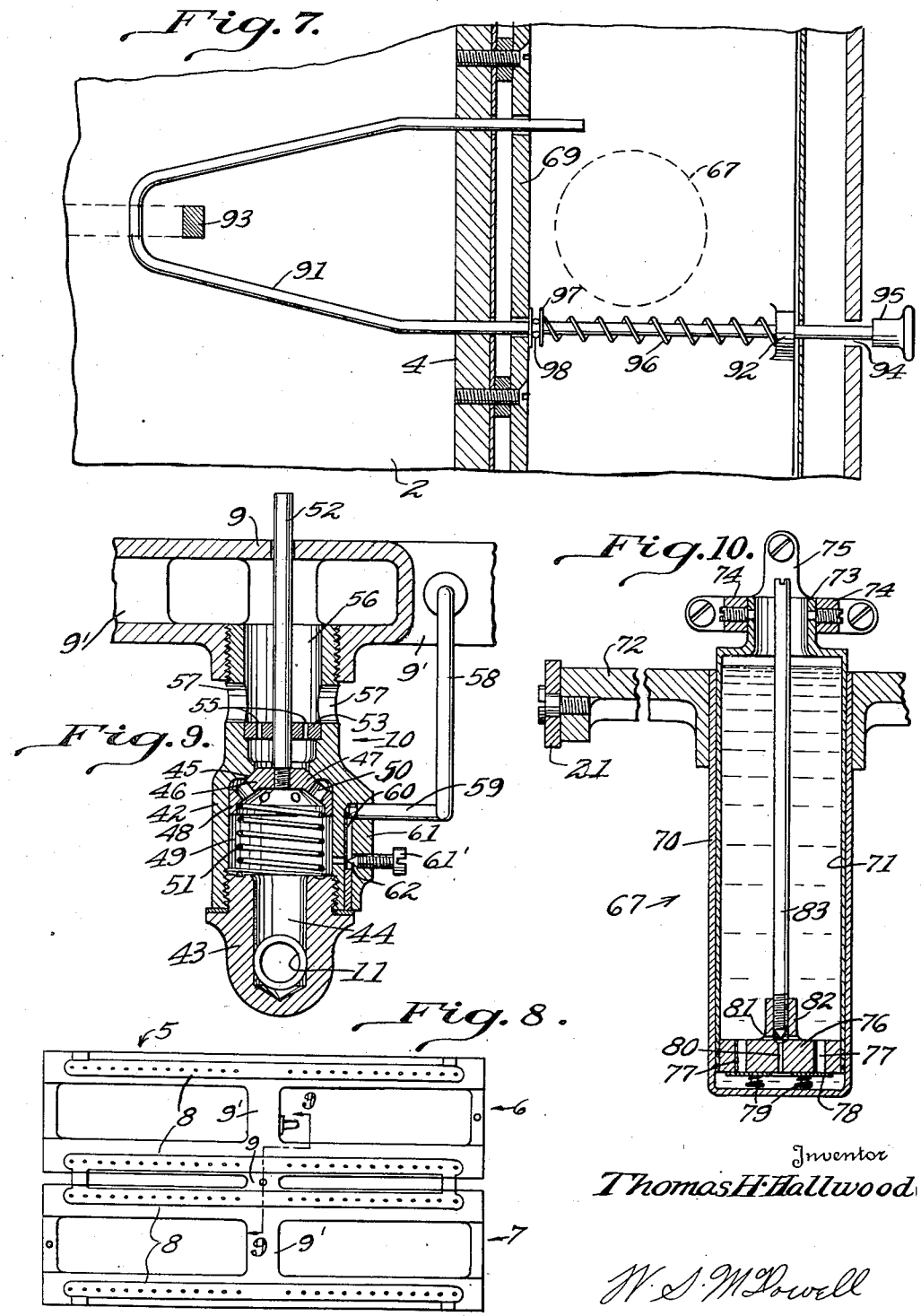

Patented Sept. 1, 1936

2,052,927

UNITED STATES PATENT OFFICE 2,052,927

BREAD TOASTER

Thomas H. Hallwood, Columbus, Ohio, assignor of one-eighth to G. A. Sundell and one-eighth to H. C. Omohundro, both of Columbus, Ohio Application June 8, 1933, Serial No. 674,864

16 Claims. (Cl. 53—5)

This invention relates to automatic bread toasting apparatus and more particularly to the type using gas as a heating medium.

The main object of this invention is to provide a device of this kind that will toast slices of bread on both sides simultaneously and after a certain predetermined period of time, automatically reduce the gas supply to render the device inactive.

Another object is to provide a device of this character which shall be more compact in size than devices of similar nature heretofore manufactured and superior thereto in point of simplicity, positiveness of operation and general efficiency.

A further object is to provide novel means for positioning the bread slices between the burners of the toaster and to simultaneously operate a valve for admitting gas thereto and produce flames that will toast the bread slices uniformly and to the same degree over the full side areas thereof.

A still further object is to provide a gas operated bread toaster having movable means by which to automatically open the gas valve for the burners upon the positioning of bread thereinto and to automatically close the valve after the release of said means by a timing mechanism.

Further objects and aims of the invention, more or less specific than those referred to above, will be in part obvious and in part pointed out in the course of the following description of the elements, combinations, arrangements of parts constituting the invention and the scope of the invention pointed out in the appended claims.

In the accompanying drawings which form a part of the specification, and in which there has been shown merely a preferred form of the invention:

Fig. 1 is a perspective view of the toaster comprising the present invention;

Fig. 2 is a vertical longitudinal sectional view taken through the bread toaster shown in Fig. 1 illustrating the arrangement of the various parts thereof;

Fig. 5 is a horizontal sectional view taken on the line 5—5 of Fig. 2;

Fig. 6 is a similar view taken on the line 6—6 of Fig. 2;

Fig. 7 is a detail sectional view taken on the line 7—7 of Fig. 2 illustrating more particularly the manual release or operating member of the bread carrier;

Fig. 8 is a detail top plan view of the burner structure;

Fig. 9 is an enlarged vertical longitudinal sectional view taken through the gas control valve as indicated by the line 9—9 of Fig. 8;

Fig. 10 is a similar view taken through the dashpot structure forming a part of the controlling mechanism for the automatic operation of the bread toaster.

Figure 3:
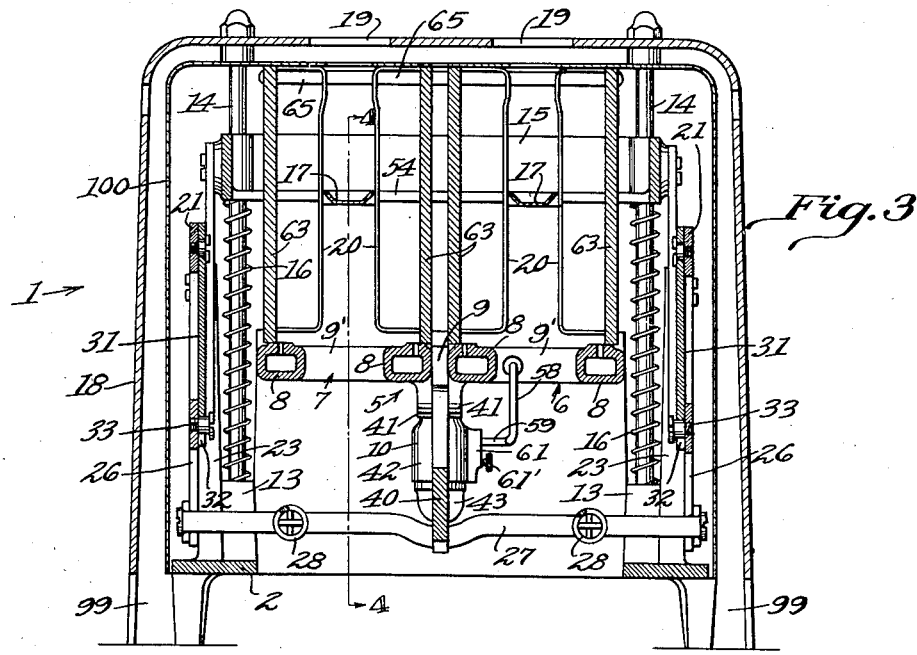
Fig. 3 is a vertical transverse sectional view taken on the line 3—3 of Fig. 2.
Figure 4:
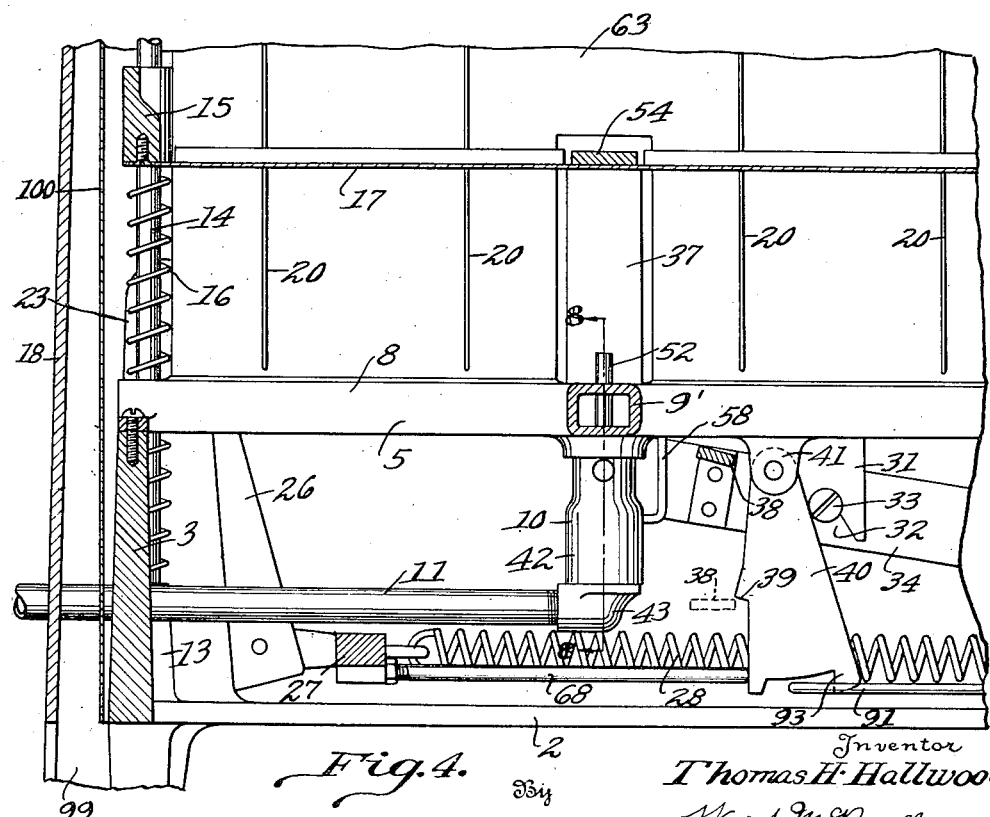
Fig. 4 is an enlarged detail view taken on the line 4—4 of Fig. 3.

Referring to the drawings for describing in detail the structure illustrated therein, the numeral 1 designates the bread toaster in its entirety which is formed to comprise a base member 2 preferably cast of metal and upon which is mounted the various parts comprising the mechanism of the toaster. Formed integral with the base unit 2 and arising from each end thereof are members 3 and 4 forming supports for the burner structure 5 which lies horizontally and is elevated by its supports from the base 2. The burner structure 5 which is bolted or otherwise secured to the top of the supports 3 and 4 comprises burner sections 6 and 7 each of which is formed to include a pair of spaced heads 8 arranged parallel to one another and extending longitudinally of the toaster structure. It will of course be understood that any number of burner sections may be utilized, within certain limits, depending upon the capacity and size of the toaster desired.

Connecting the central portions of the burner sections 6 and 7 is a transversely arranged feeding duct or fuel passage 9 having branches 9' extending between the heads 8 and positioned in the duct 9 is a valve member 10 for controlling the admission of gas to the burners from a supply pipe 11. A shut-off valve 12 may be positioned in the pipe line exteriorly of the toaster for further controlling the gas flow to the toasting device.

Carried by the base 2 and arranged adjacent the ends of the supporting members 3 and 4 are bosses 13 with which are rigidly connected upstanding posts 14 upon which is mounted for vertical movement a holder or bread carrying frame 15. Received upon the posts 14 and positioned between the bosses 13 and the bread carrying frame 15 are coil springs 16 which serve normally to hold the bread carrying frame in an elevated or spaced position from the burner structure. The bread carrier 15 which is of an open rectangular frame formation and of a size substantially equal to that of the burner structure, has attached thereto a pair of spaced parallel and longitudinally arranged metallic bread supporting strips 17 attached by suitable means to the under side of the carrier frame. The strips 17 are formed angularly or substantially V-shaped to centralize the slices and hold the same in an upright position between the flames of the burner heads.

Attached to the upper ends of the posts 14 and covering the various mechanisms of the toasting apparatus is a housing 18 which has its upper wall surface formed with slots 19 arranged in registration with the V-shaped bread supporting members 17 and through which slots the bread slices are inserted into the toaster or removed therefrom. Vertically arranged wires 20 are also provided which are stationarily arranged on each side of the slots 19 and the bread slice holders 17 for guiding the slices in place and holding the same in their upright position.

In order to move the carrier 15 with bread slices thereon into toasting relationship with the burner structure 5, a lever 21 is provided which is of a substantially U-shaped formation and has its inner forked end pivoted as at 22 to a pair of uprights 23 arising from and integrally formed with the base unit 2. The outer end of the lever is provided with a handle 24 which extends through a slot 25 formed in the front wall of the casing 18 and by which handle the lever is manually operated. Formed with the pivoted ends of the side bars of the lever are depending leg members 26 which have their lower ends pivotally connected to a yoke member 27 lying horizontally above the supporting base 2. Connected with the yoke is one of the ends of a pair of springs 28 which have their other ends anchored to bolts 29 mounted within openings formed in the burner supporting member 4 and capable of being adjusted longitudinally therein by threaded fastening devices 30 and by which the tension of the springs may be varied to suit the requirements.

Pivoted at a point intermediate the ends of the lever 21 and extending downwardly therefrom are push links 31 which have their lower ends notched or formed V-shaped as at 32 for the reception of studs or pins 33 carried by a pair of arms 34 pivoted at one of their ends, as at 35, to lugs 36 extending upwardly from the forward end of the base 2. The free ends of the arms 34 are pivotally connected to the lower ends of a pair of links 37 which in turn have their upper ends similarly connected to the side members of the bread carrying frame 15. By this lever arrangement, it will be seen that as the lever 21 is pushed downwardly in the slot 25 of the casing through the medium of the handle 24, the push links 31 will engage the pins 33 of the arms 34 and due to their connection through the links 37 with the bread carrier, the latter will likewise be moved downwardly. This downward movement of the bread carrier upon the supporting posts 14 will compress the coil springs 16 interposed between the carrier and the bosses 13 and position the carrier in toasting relationship with the burner structure.

To retain the bread carrier in its lowered position effected by the actuation of the lever 21, the arms 34 have connected therewith a strap or bar 38 and adapted to engage with a shouldered projection 39 formed upon a latch member 40 which is connected for free swinging movement with a pair of ears or lugs 41 cast integral with the under side of the burner structure 5. The latch 40 is so arranged that when the bar 38 engages the edge bevel of the projection 39, the latch 40 will swing against its own weight away from the bar and when the bar frees the projection or shoulder 39, the latch will again swing towards the bar with the projection thereof overlying the bar and thereby lock the carrier in its lowered position.

Due to the fact that the lever 21 has an open connection with the arms 34 through the V-shaped notches of the links 31, the lever 21 may return, by the action of the tension springs 28, to its raised or elevated position although the bread carrier 15 remains in its lowered position adjacent the burner. An important feature of the invention is the arrangement of the lever 21 together with the various links and arms associated therewith, in that by the use thereof the movement of the lever may be cut down to a minimum and yet effect a considerable movement on the part of the bread carrier. Another advantage gained by this compound lever arrangement and particularly the use of the arms 34 and the vertical links 37 is that the bread carrying frame 15 will thus be moved in a straight downward direction and thereby exerting an equal pressure upon all the coil springs supporting the same, which will also tend to eliminate undue binding action upon the guiding rods or posts 14.

The gas flow regulating valve 10 which is automatically operated by the lowering of the bread carrier 15 comprises a substantially cylindrical body or casing 42 externally threaded at its upper end for the reception within a threaded bore formed in the lower wall of the fuel feeding duct 9. The lower end of the valve casing is closed by an elbow fitting 43 which is threadedly secured to the valve casing and provided with a bore 44, open at its upper end into the interior of the casing and the lower or outer end thereof threaded for the connection to the gas supply pipe 11.

Formed interiorly of the valve casing at a point intermediate of its ends is a tapered seat 45 which is engaged by a similarly tapered head 46 of a valve member 47. The valve head 46 is provided with a skirt member 48 which snugly fits the inner cylindrical side wall of the bore 49, and provided in the head 46 at a point below its engagement with the seat 45 are openings or passages 50 which function when the valve is open to permit gas to pass through the valve structure. The valve is held in its raised seating position by a coil spring 51 having its upper end arranged within the skirt member 48 and its lower end seated upon a shoulder formed with the elbow fitting 43.

To effect the opening of valve 47 against the action of the coil spring 51, the valve head has threadedly attached thereto an upwardly directed operating stem 52 which extends through a perforated washer 53 arranged immediately above the valve seat with the upper end of the stem passing through an opening formed in the upper wall of the burner structure 5. The upper end of the stem 52 extends a sufficient distance above the burner so as to be engaged by a transverse brace 54 formed with the bread carrier 15 and depressed thereby to hold the valve open when the carrier is in its lowered position adjacent the burner structure. With the valve in this open position, the gas will pass through the openings 50, past the valve seat and through the openings 55 formed in the washer 53 and into the burners by way of the bore 56. The valve casing above the washer 53 is provided with openings 57 through which air is drawn with the gas in its passage into the burner to thereby form a combustible mixture and which air supply may be governed or controlled by the size opening or openings formed in the valve casing.

In order to effect the pilot lighting of the burners, a small portion of the gas is by-passed from the valve structure 10 through an upstanding gas conducting pipe 58 which has its upper end terminating in one of the feeding duct branches 9'. The lower end of the pipe 58 is bent as at 59 and connected within a passage 60, formed in an enlargement 61 of the valve casing 42, which has its lower end in open communication with the interior of the valve casing. To regulate the amount of gas passing through the pipe 58, an adjustable bleed valve 61' is provided which is threaded into the side wall of the valve casing and has its inner tapered end 62 entering the passage 60 so as to restrict the amount of gas passing therethrough.

Arranged above the burner head and to one side of the gas orifices thereof are longitudinally and vertically positioned panels or wall members 63 which are preferably formed from asbestos or like materials and serve as backings for the flames to spread the latter into a thin sheet of fire which will uniformly toast the whole side areas of the bread slices. The panels are held in their upright position by means of brace constructions 65 connecting the upper ends of the panel members and the central portions thereof are slotted for the reception of the gas valve actuating brace 54 of the bread carrier 15.

An important feature of the present invention is the automatic controlling device, for timing the toasting operation of the bread, which in this instance is in the form of a dashpot structure, generally indicated by the numeral 67, and connected for operation with the manually operated lever 21 for checking the upward movement thereof imparted by the springs 28. Located in alignment with the latch 40 and attached to the yoke 27 connected for movement with the lever 21, is a latch operating pin 68 which is adapted to engage and move the latch so as to release the toast carrier 15 and permit the same to be elevated by the action of its lifting springs 16 when the lever 21 has nearly reached its uppermost position, governed by the action of the dashpot controlling device. The latch pin 68 is adjustably secured to the yoke so as to effect proper engagement thereof with the latch in releasing the latter's hold upon the bread carrier mechanism.

The dashpot structure 67 is positioned at the forward portion of the toaster and separated from the burner compartment thereof by a wall 69, so that the dashpot in which a suitable grade of oil or other liquid is used, will not be effected by the heat developed by the burner mechanism.

The construction of the dashpot includes an outer and an inner cylindrical member 70 and 71 respectively, of which the outer member has its upper end attached in any suitable manner to a brace 72 which has its ends pivotally secured to the side bars of the operating lever 21. The inner member 71 which snugly fits the interior of the outer member 70 and is adapted for telescopic movement relative thereto has its upper end provided with a reduced extension 73, arranged for pivotal movement between a pair of spaced lugs 74 formed with a bracket 75 secured to the partition wall 69. Closing the lower end of the inner member 71 is a head 76 provided with ports 77 extending therethrough and forming communications between the cylinders of the dashpot. Arranged below the head 76 and normally obstructing the ports 77 therein is a disk 78 supported upon springs 79 operatively carried by the head 76. Also formed in said head is a centrally disposed restricted port or passage 80 having its upper end terminating into laterally directed branches 81 provided in an upstanding boss 82 and establishing communication between the cylinder sections 70 and 71. Threaded into the boss 82 and entering the passage 80 is the lower tapered end of a valve rod 83 which extends the full height of the dashpot and has its upper end provided with a slot for the reception of a suitable tool such as a screw driver or the like and by which the valve rod may be adjusted to restrict or regulate the oil flow from one cylinder to the other.

It will be seen that as the lever 21 is depressed, the outer cylinder 70 of the dashpot will also, due to its connection with the lever, be moved downwardly causing longitudinal separation of the cylinders with respect to one another. This will tend to produce a suction or vacuum below the head 76 and effect the uncovering of the ports 77 by the spring-pressed disk 78 permitting the free flow of oil from the inner to the outer of the cylinders or to the space below the head 76. Upon the return of the lever with the outer of the cylinders to a normal raised position, effected by the springs 28, the disk 78 will close the ports 77 and limit the flow of oil to the passage 80 through which it will be restricted by the adjustment of the valve 83. This restriction of the oil flow will check the upward movement of the lever 21 which thus controls the timing of the toasting operation and permits the bread slices to be toasted to any desired degree, depending upon the amount of adjustment of the valve member 83.

In the operation of the toasting device, it will be understood that the bread slices will be inserted into the toasting chamber through the slots 19 formed in the top of the toaster casing which will position the slices upon the bread supports 17 of the bread carrier. The lever 21 is then depressed, through the medium of the handle 24, until the lever is in its fully downward position which will place the bread carrier adjacent the burner structure and permit the latch member 40 to rock to a position overlying the bar 38, locking the bread carrier in place. This downward movement of the bread carrier will also effect the opening of the gas controlling valve 10, thereby starting the toasting operation of the bread. Upon release of the handle 24, the lever 21 will return to its uppermost or elevated position by the action of the springs 28, which upward movement is controlled or checked by the dashpot structure 67. The release of the bread carrier is so arranged that just before the lever 21 reaches its uppermost position, the latch pin 68 will engage the latch 40 and move the latter free from engagement with the bar 38 permitting the spring pressed bread carrier to move upwardly away from the burner structure and position the toasted bread slices part ways above the casing where it may be grasped for removal from the toaster. As the bread carrier in its upward movement disengages the stem 52 of the gas controlling valve, the valve is permitted to close, shutting off the effective gas flow to the various burner sections and thereby rendering the toaster ineffective.

If for any reason it should be desired to release the bread carrier before the toasting operation is completed, a manual release is provided in the form of a bail 91 which is mounted for sliding movement within bearing openings formed in the burner support 4 and a lug 92 formed with the base unit 2. The inner looped portion of the bail underlies the latch member 40 and is adapted to engage with a projection 93 formed with the underside of the latch and lying in the path of movement of the bail. The outer end of the bail extends through a slot 94 formed in the lower edge of the front wall of the casing and provided with an operating knob 95 by which the bail may be pulled in an outward direction, to engage the projection 93 and cause the latch member to follow therewith in an outward direction and release its hold upon the bread carrier mechanism. To keep the bail in its forward position out of engagement with the projection 93 of the latch, a coil spring 96 is provided which is arranged around one leg of the bail and positioned between the stationary lug 92 of the base and washers 97 held in place upon the bail by projections 98 struck from the bail body and which together with one of the washers also serve as a stop for the bail in an inward direction. The inner looped end of the bail is so arranged as to be normally out of engagement with the latch and not interfering with the movement of the latch under ordinary conditions.

The outer casing 18 of the toaster which may be of any suitable design or shape has its lower end formed with supporting legs 99 between which open spaces are provided for the entrance of air to the toaster and to permit circulation of air around the mechanism to carry off heat therefrom. To prevent direct radiation of heat from the burners to the outer casing, an inner casing 100 is provided which is preferably formed of sheet metal and arranged spaced from the walls of the casing 18 to allow for the circulation of air therebetween. If desired, the outer casing may also be provided with openings 101 around its upper edge to permit escape of heat therefrom and which opening may be of ornamental outline so as to add to the appearance of the apparatus.

The purpose of utilizing the complete burner structure as a pilot is to maintain the asbestos panels at a uniform temperature. This will enable the machine to deliver the same grade of toast in an equal time period at all times.

Although there has been shown and described what is considered to be the preferred embodiment of the invention, it will be understood that many slight changes could be made in the construction of the toaster without departing from the scope of the invention, as defined in the following claims.

What is claimed is:

1. In a gas toaster, a base, a burner mechanism supported upon said base, a bread carrier arranged for vertical movement above said burner mechanism, a pivoted actuating lever for effecting the movement of the carrier to a toasting position adjacent said burner mechanism, means for locking said bread carrier in this latter position, means for releasing said locking means, and engaging elements between the bread carrier and said lever for permitting the latter to return to its normal position free from engagement with the bread carrier.

2. In an automatic gas toaster, a base, a burner mechanism carried by said base, a toast carrier mounted for vertical movement above said burner mechanism, spring means for normally holding said carrier in a raised position spaced from said burner mechanism, means for holding said carrier in its lowered position against the action of said spring means, a manually operated lever mechanism for lowering the carrier into toasting position, the engagement between said carrier and lever mechanism being such that the lever will return to its normal position independently of said carrier, means for returning said lever mechanism to a normal raised position, means operated by said lever mechanism during its return movement for releasing said holding means, and a timing mechanism for controlling the return movement of said lever mechanism.

3. A gas toasting apparatus comprising a base, a burner mechanism supported above said base, a bread carrier arranged for vertical movement above said burner mechanism, a gas controlling valve actuated to an open position by the movement of the carrier when the latter is moved in a downward direction adjacent said burner mechanism, means for locking the carrier in its lowered position, a pivoted actuating lever for effecting the downward movement of the carrier to a toasting position, means for returning said lever to a normal position independently of said carrier, means cooperating with said lever during its return movement for releasing said locking means, and a dash pot structure connected with the free end of said lever for controlling the return movement thereof.

4. In a gas toaster, a base, a burner mechanism supported upon said base, a bread carrier arranged for vertical movement above said burner mechanism, a lever pivoted at its inner end and arranged to move said bread carrier to a toasting position, a spring pressed valve for controlling the gas supply to said burner, said valve being opened by the final stage of downward movement of said bread carrier, and means for retaining said bread carrier in its toasting position and said valve in its open position, said means being released by said pivoted lever.

5. In a gas toaster, a base, a burner mechanism supported upon said base, a bread carrier arranged for vertical movement above said burner mechanism, a lever pivoted at its inner end and arranged to move said bread carrier to a toasting position, a spring closed valve for controlling the gas supply to said burner, said valve being opened by the final stage of downward movement of said bread carrier, means for retaining said bread carrier in its toasting position and said valve in its open position, and means cooperating with said lever for releasing said retaining means to permit said carrier to raise and said valve to close.

6. In a gas toaster, a base, a burner mechanism carried by said base, a toast carrier, a main lever pivoted at its inner end to said base, spring means for holding said lever in its elevated position, a second lever mechanism connected to said toast carrier and base and cooperating with said main lever to move said toast carrier to a toasting position, a valve for controlling the gas supply for said burner, said valve being opened by the final stage of downward movement of said bread carrier, means for retaining said bread carrier in its toasting position and said valve in its open position, means for returning said main lever to a normal position independently of said carrier, means cooperating with said main lever upon its return movement for releasing said retaining means, and a dashpot connected to said main lever for controlling the action thereof.

7. A gas toaster consisting of a burner mechanism, a toast carrier formed to be arranged adjacent said burner mechanism, a valve for controlling the admission of gas to said burner mechanism, and a single operating member for said valve engaged directly by said toast carrier and operated thereby.

8. A gas toasting apparatus comprising spaced burners, a bread carrier formed to be arranged between said burners, a control valve for said burners, an operating member for said valve positioned in the path of movement of the toast carrier and operated thereby to open said valve, means for maintaining said carrier between the burners during the toasting operation, and automatic means for actuating said first-named means to effect the release of said carrier and the simultaneous closing of said valve.

9. A gas toasting apparatus comprising a support, a burner mechanism mounted upon said support, a gas controlling valve arranged beneath said burner mechanism, an operating member extending therefrom, a spring-pressed bread carrier mounted for substantially vertical movement above the burner mechanism, a transversely extending member formed with said carrier arranged to directly engage said valve operating member to open said valve when said carrier is moved in a downward direction adjacent the burner mechanism, means for maintaining said carrier adjacent said burner mechanism, a single manually operated lever for effecting the downward movement of said carrier against the action of its springs, and automatic means operated by said lever during its upward movement for effecting the release of said carrier after a predetermined period of time.

10. In a toaster, a support, a main lever pivoted at its inner end to said support, a secondary lever mechanism pivoted at one end to said support, a toast carrier connected to the opposite end of said secondary lever mechanism, and means for connecting the intermediate portion of said secondary lever with said main lever to impart movement to said toast carrier.

11. In a toaster, a support, a main lever pivoted at its inner end to said support, a secondary lever mechanism pivoted at its outer end to said support, a toast carrier connected to the opposite end of said secondary lever mechanism, and single direction motion transmitting means arranged between the intermediate portion of said secondary lever and said main lever.

12. In a toaster, a support, a main lever pivoted to said support, a secondary lever pivoted at one end to said support, a toast carrier connected to the opposite end of said secondary lever, motion transmitting means arranged between the secondary lever and the main lever, a dash pot pivotally connected to the free end of said main lever, and a dash pot piston connected to said support, said piston being slidably received within said dash-pot to govern the movement of said main lever.

13. In a toaster, a support, a main lever pivoted to said support, spring means for moving said lever to a raised position, a secondary lever pivoted at one end to said support, a toast carrier connected to the opposite end of said secondary lever, spring means for moving said secondary lever and toast carrier to an elevated position, latch means for holding said carrier and secondary lever against the action of said spring means, and motion transmitting means arranged between said main and secondary levers, said means permitting said main lever to return to its raised position while said secondary lever is held by said latch.

14. In a gas toaster, a support, a burner carried by said support, a main lever pivoted at its inner end to said support, spring means for normally holding said lever in a raised position, a secondary lever pivoted at its forward end to said support, a toast carrier mounted for substantially vertical movement connected to the opposite end of said secondary lever, spring means for moving said toast carrier upwardly, motion transmitting means between said main lever and the intermediate portion of said secondary lever for positioning said toast carrier adjacent said burner when said main lever is depressed, means for retaining said carrier in its lowered position while said main lever is returning to its normal position, means operated by said main lever immediately before it reaches its normal position for releasing said retaining means, and timing means connected to said lever for governing its return to a normal position.

15. In a toaster, a support, heating means carried by said support, a main lever pivoted at its inner end to said support, a secondary lever mechanism pivoted at one end to said support, a toast carrier connected to the opposite end of said secondary lever mechanism, means for connecting the intermediate portion of said secondary lever with said main lever to move said toast carrier to a position adjacent said heating means, and controlling means for said heating means actuated by said toast carrier.

16. In a toaster, a support, heating means carried by said support, a main lever pivoted at its inner end to said support, said main lever being provided with a depending arm, substantially horizontally extending spring means connected to said arm and support to yieldably hold the free end of said lever in a raised position, a secondary lever mechanism pivoted at one end to said support, a toast carrier connected to the opposite end of said secondary lever mechanism, single direction motion transmitting means for connecting the intermediate portion of said secondary lever with said main lever to move said toast carrier to a position adjacent said heating means, spring means for moving said carrier to an elevated position, latch means for holding said carrier in a lowered position against the action of said spring means, and controlling means for said heating means actuated by said toast carrier.

THOMAS H. HALLWOOD.